United States Patent [19]
Pauls

[11] Patent Number: 5,958,310
[45] Date of Patent: Sep. 28, 1999

[54] PROCESS FOR THE PRODUCTION OF SUBSTANTIALLY HOMOGENEOUS MIXTURES

[75] Inventor: Mathias Pauls, Appenzell, Switzerland

[73] Assignee: Rathor AG, Appenzell, Switzerland

[21] Appl. No.: 08/776,498

[22] PCT Filed: Jul. 28, 1995

[86] PCT No.: PCT/EP95/03010

§ 371 Date: Apr. 22, 1997

§ 102(e) Date: Apr. 22, 1997

[87] PCT Pub. No.: WO96/03204

PCT Pub. Date: Feb. 8, 1996

[51] Int. Cl.$^6$ ..................................................... B29C 35/02
[52] U.S. Cl. ............................... 264/13; 264/28; 528/44; 528/85
[58] Field of Search .......................... 528/44, 85; 264/13, 264/28

[56] References Cited

U.S. PATENT DOCUMENTS 4,350,803  9/1992  Penn .......................................... 528/44

FOREIGN PATENT DOCUMENTS 04 55115 A2  11/1991  European Pat. Off. .
1960682  6/1971  Germany .

*Primary Examiner*—John M. Cooney, Jr.
*Attorney, Agent, or Firm*—Townsend and Townsend and Crew LLP

[57] ABSTRACT

In a process for producing substantially homogeneous mixtures of reactive substances the substances are brought into a cold zone separately from one another and cooled until they exist in a solid and unreactive state, and then introduced into a mixing zone in a finely dispersed state and mixed together there, the temperature in the mixing zone being held below the softening temperature of the mixing obtained therein.

17 Claims, 4 Drawing Sheets

PROCESS FOR THE PRODUCTION OF SUBSTANTIALLY HOMOGENEOUS MIXTURES

BACKGROUND OF THE INVENTION

This invention relates to a process for producing substantially homogeneous mixtures of reactive substances.

In chemical engineering there are numerous processes for mixing together substances reactive with one another in such a way that they react with one another in a desired way. The great number of processes reflect the problem of producing mixtures. It is thus common to work in diluting solvents which simultaneously serve to supply or remove energy, whereby all reacting components present are dissolved in the solvent or the reacting agents are united gradually, e.g. drop by drop. Other mixing techniques involve bringing together two educt streams in a reaction chamber, gradually dissolving or reacting a first component in a reacting medium containing one or more further components or controlling reactions by adding catalysts. It is common to use mechanical or other stirring tools to achieve a thorough mixture of the reacting medium necessary for the reaction. Nevertheless it is still problematic to produce a highly homogeneous mixture of reactive substances which is optimal for the particular purpose, in particular because the chemical reactions already start during the mixing process, i.e. before an optimal mixture of the components has taken place. This frequently detracts from the yield and purity of the products and results in increased costs for the products because of low yield, and the need for elaborate cleaning methods or complicated apparatus for producing the mixtures.

One also commonly tries to optimize chemical reactions by working in large quantities of solvent to influence the mixing behavior of the reacting agents and thus the reaction course via the diluting effect. Large quantities of solvent require elaborate recovery processes, apart from the fact that the quantities of solvent must not only be supplied but also handled, separated, cleaned/reprocessed or eliminated.

In particular in the conversion of highly reactive substances there can be undesirable consecutive reactions if one does not succeed in distributing the reacting agents homogeneously. Such distribution is problematic, however, when one substance must be mixed into a second one, as is frequently done in the laboratory with the help of dropping funnels. At the place where the added substance passes into the reacting medium a high concentration forms temporarily which, in the case of fast reactions, cannot be reduced using conventional mixers and stirrers fast enough to avoid merely pointwise conversion with consecutive reactions.

The same holds for the production and further processing of plastics when several reacting agents are present. Pointwise reaction can lead to changed reaction conditions at certain points and thus influence the nature, structure or distribution of the products. This also holds for example for catalyzed reactions when the catalyst is not distributed homogeneously. Such inhomogeneities also occur for example in the hardening of polyurethane foams when for example moisture-hardening foams full-harden with the entrance of atmospheric humidity from the outside to the inside, the second component in 2C foams is mixed incompletely with the first component and therefore reacts only locally, or reactions take place with introduced water, on the one hand, and with an added agent, on the other, in the recycling of prepolymer residues. Since the reactions take place in accordance with the availability of the reactive substances, inhomogeneities both impair the products and cause problems in carrying out recycling processes, in particular because the simultaneous presence of cans which are empty except for a small remainder, partly full cans or full but useless cans can cause different qualities of prepolymers, different quantities of hardeners and, in the case of cans that have become moist, also different quantities of water to be brought into the process. This results furthermore in a batch-dependent quality of the products.

SUMMARY OF THE INVENTION

A need therefore exists for a mixing process which makes it possible to mix chemical substances reactive with one another in substantially homogeneous fashion without a reaction occurring before the end of the mixing process.

This problem is solved by a process of the above-mentioned type wherein the substances are introduced into a cold zone separately from one another and cooled until they exist in a solid and unreactive state, and then introduced into the mixing zone in a finely dispersed state and mixed together there, the temperature in the mixing zone being held below the softening temperature of the mixture obtained therein.

The mixtures produced in the inventive process are stable only at the particular low temperatures, so that upon a temperature increase a reaction occurs when a minimum temperature necessary for starting the reaction is exceeded. It can generally be assumed that a slow reaction starts when the melting temperature of one of the reactive substances is reached. It is therefore important that the substances be held below the particular softening temperature per se and in mixture.

The inventive process serves to mix at least two components together, but more than two components can also be mixed together. One of the components can be a catalyst. In addition it is possible during production of these mixtures to admix additives intended to be contained in the resulting products, as well as solvents which can be of importance for the course of the reaction, for example for temperature control. At least one of the reactive substances is generally a liquid under normal conditions or at the reaction temperature or exists in solution.

The inventively obtained mixtures can be further processed immediately by being brought to a temperature beneficial for reaction or being introduced into a reacting medium, or they can be stored or transported in a cooled state. It is also conceivable to package such reactive mixtures suitably or put them into a form suitable for an application and preserve them in a cooled state so that for their use at a different place they can merely be taken out of a cold chest and used there. This can be done for example in a chemical laboratory or plant, or also by a workman who for example brings a reactive mixture for producing a foam to a desired place and foams it there by the action of temperature. A further possible application is for example a mixture of reactive substances which are stored unchanged side by side at low temperatures but upon a temperature increase, for example above 0° C., cause a color reaction so that such a mixture can be used as an indicator for uninterrupted operability of a cooling unit.

The inventive process is preferably performed at a temperature below −80° C. It is especially expedient to carry out the process at the temperature of liquid nitrogen. One then expediently works in the absence of oxygen, which can also be necessary at higher temperatures and with oxygen-sensitive substances.

The substances reactive with one another are generally liquid substances or at least include one liquid substance which can serve as a solvent for one or more substances. It is thus important to bring this liquid substance into a solid form to prevent reaction, which is done in the cold zone. One can naturally also use substances in solution, in particular when the solvent is required for the later reaction.

To bring the reactive substances used into the finely dispersed form necessary for mixture one can use any desired crushing process. It is especially expedient to use spray processes in which the liquid substance or the substance in solution is atomized while being cooled so that a small-sized powder arises. A further preferred possibility is to pulverize in a mill, a hammer mill or the like the reactive substance initially solidified in a crude form. Furthermore it is possible to obtain the substance in powder form via a spray drying process, the powder optionally first being cooled to the low temperature required for the mixing process.

The mixing zone used according to the invention is expediently a spray tower. A first substance can be fed to this spray tower from above in the form of a small-sized powder, for example, and a second or further reactive substances sprayed in while being cooled and solidified. To guarantee the low temperature in the spray tower required by the process, it can be necessary to spray in liquid or gaseous nitrogen for temperature control, it being preferable to spray cold gaseous nitrogen into the lower area of the spray tower and have the exit at the upper end in order to attain a swirling effect.

The inventive process is especially suitable for use in recycling packings containing reactive residues. Special mention must be made here of packings holding isocyanate-containing prepolymers for polyurethane foams. The inventive process will therefore be described in the following in terms of a recycling process for cartridges holding prepolymers containing isocyanate groups for polyurethane foams.

Residue-containing packings as occur for example in great quantities in the form of wholly or partly empty cartridges are increasingly becoming a disposal problem. They cannot be dumped on disposal sites for reasons of environmental protection since the residues contained therein can pass into the atmosphere, the soil or the groundwater and lead to considerable damage there. The same holds for burning, which is frequently incomplete in particular with industrial chemical products and produces great quantities of pollutants which can be controlled only by elaborate measures, if at all. Burning thus leads to a great reduction in the volume of waste but does not necessarily solve the pollution problem.

Special problems arise when the residues contained in the packings are themselves reactive and possibly even toxic products, as is the case for example with isocyanate-containing prepolymers for polyurethane foams. The same holds for other reactive plastic products, for example self-curing or hardenable mixtures for coatings, adhesive mixtures, etc.

Polyurethane foams are commonly discharged from cartridges which contain a polyurethane prepolymer together with required additives. These cartridges cannot be reused. On the other hand, they are problem wastes which cannot be disposed of in the normal way.

In accordance with efforts to limit household and industrial waste, measures are being increasingly discussed and implemented to force manufacturers to take back their product packaging after use and ensure its reuse or disposal themselves. Such measures have made it necessary to find ways of treating such waste economically. The treatment of returned cartridges for polyurethane foam production involves a number of problems which complicate economic recycling. For example, some returned cartridges can be under pressure due to the penetration of moisture during improper storage or treatment, which makes both opening and burning a problem. Furthermore the cartridges have different filling conditions, ranging from over-aged cartridges virtually full of prepolymer which cannot be discharged due to a blocked valve, to virtually empty cartridges with only a remainder of prepolymer adhering to the edges in an uncrosslinked to crosslinked state.

Up to now a number of processes have become known for recycling packings, including aerosol cans for polyurethane foam production. For example it has been proposed to pass pressure cans via a sluice system into a plant under inert gas and crush them there. Further, processes have become known for passing aerosol cans into a plant, crushing them there and extracting the ingredients with suitable solvents. In these processes both the packing materials and the ingredients (prepolymer, propellant) are recovered.

However these known processes, some of which are quite efficient and in use, are capable of being improved with regard to industrial safety, process control and quality of the products. It is problematic to separate the residues contained in the packings in a simple fashion and obtain homogeneous products for suitable reuse.

The inventive process makes it possible to process reactive residues of packings in a fully safe way. The reactive residues, for example isocyanate-containing prepolymers in cartridges for producing polyurethane foam, are treated in a safe manner. Due to the freezing of the reactive substances or residues there is neither a reaction-induced pressure increase in the process nor undesirable reaction between reactive components. At the temperatures prevailing in the process the presence of water is also harmless. The two latter points are of importance in treating isocyanate-containing products when for example damaged packings carry water into the process. At the same time, reactive second components contained in so-called 2C foams, for example glycols, carboxylic acids or water, can be easily introduced into the process. The inventive process is thus suitable for treating both cartridges for 1C and 2C foams and transitional forms between the two simultaneously, and for converting the reactive residues into high-quality and homogeneous products.

In the inventive process packings, for example cartridges, are first introduced into a cold zone and cooled therein until the reactive residues therein, including any low-boiling solvents therein, solidify. Temperatures lower than $-80°$ C. to $-100°$ C. are generally sufficient for this purpose, but one expediently works in liquid nitrogen as a cooling medium. In this case it is important that the process be performed in the absence of oxygen to avoid condensation of liquid oxygen, which could have an adverse effect in later process steps.

When the desired temperature is reached, generally the temperature of liquid nitrogen, the packings are crushed in the cold state. The temperatures here should expediently be under $-80°$ C. to $-100°$ C.; it might be necessary to spray in liquid nitrogen or cold gaseous nitrogen.

Crushing is expediently done in a hammer mill working against a sifter. This achieves a shaking and fulling effect which not only crushes to a desired particle size but also separates the various materials: metal, paper, plastic and ingredients. It has surprisingly turned out that the packing materials (metal, paper and plastic) can thereby be separated extremely well from the ingredients (reactive residues and solvents/additives in powder form), the ingredients being obtained as fine powder.

In a subsequent separating step the crushed packings are divided into at least two fractions, one of which contains the reactive residues including propellant in a solid state. This separating step expediently uses a sifter, preferably a riddle sifter, through which the fine components (mainly reactive residues and solvent) fall. Metal parts are separated with magnetic methods, large plastic parts and scraps of paper sieved out on the riddle sifter.

The frozen ingredients from reactive substances and solvent pass from the separating zone into a mixing zone in which an agent reactive with the residues is simultaneously introduced as a further reactive substance. Temperatures lower than $-80°$ C. to $-100°$ C. also prevail in this mixing zone to ensure the frozen state of the introduced materials and solidify the sprayed-in reactive agent immediately into a fine powder. This permits formation of a uniform mixture of ingredients in powder form and reactive agent, which cannot react due to the prevailing temperature conditions. The temperatures in the mixing zone are in any case below the melting point of both the residues and reactive agent and the mixture.

A spray tower is expediently used as a mixing zone, the frozen ingredients falling in from above. The reactive agent is sprayed into this powder stream from lateral nozzles, preferably together with cold gaseous nitrogen to ensure the necessary low temperatures. It is expedient to precool the reactive agent but it must remain sprayable.

It can be expedient to spray in the reactive agent together with a catalyst which promotes the reaction with the reactive residues of the packings. This is generally unnecessary with isocyanate-containing prepolymers, however, when the isocyanate-containing mixtures already contain such catalysts.

The cold powdery mixture of ingredients and reactive agent and optionally catalyst is then guided into a reaction zone which consists for example of a conveyer belt moving continuously under the mixing zone. The powder collecting here is then brought to a temperature sufficient for reaction in order to react. Any solvents contained therein evaporate at this point and are condensed out at a suitable place, which is no problem when nitrogen is used as a cooling medium. To give the reaction product the desired form the conveyer belt can have lateral limits. For separating the reaction product from the conveyer belt it is possible to provide parting means, for example suitable coatings or release paper. The heating in the reaction zone is expediently done with microwaves, which cause fast direct heating of the powder material from the inside to the outside so that uniform degassing and heating occur.

Following the reaction zone one can provide further processing and treating zones as well as a final sluice for passing out the reacted material.

As mentioned above, the inventive process is especially suitable for recycling residue-containing polyurethane foam cartridges. In this case the reactive agent is in particular a hydroxy compound, for example water, ethylene glycol, propylene glycol, glycerol, oligomers and mixtures thereof as well as derivatives thereof. Ethylene glycol, water and polyether alcohols are preferred, whereby in any case at least two reactive hydrogen atoms should be present. Polycarboxylic acids can likewise be used. Especially suitable polyether alcohols are available under the trademark Jeffamines.

In recycling packings for producing polyurethane foams it is advantageous to convert the isocyanate-containing prepolymers in the process itself into foam materials which can be used for example for insulating purposes. The inventive process can thus continuously produce insulation boards, whereby the propellants contained in the powder produced in the mixing zone promote foam formation. It is also readily possible to produce foils or to admix additives, for example cellulose-containing materials, and then press these mixtures into composite materials during or after reaction. However it is preferable to produce granules from reacted material which are further processed later.

The inventive process can be used in particular for recycling pressureless polyurethane foam cartridges which are emptied on site using a suitable pistol and then returned to the manufacturer for recycling. These cartridges, which are used both for 1C and for 2C foams, are pressureless during storage and generally contain no expanding or foaming agent. If an improvement in foaming behavior is necessary and this improvement cannot be achieved by using water as the second component, low-boiling solvents can be present, for example pentane, which are liquid at normal temperature, solid at the temperatures of liquid nitrogen, but evaporate with the second component at the reaction temperatures of the prepolymer and produce an expanding effect. The inventive process can likewise be used for aerosol cans for polyurethane foam production if an effective separation of propellant is ensured during the later reaction. The process is thus fundamentally applicable for recycling packings which contain not only reactive substances but also expanding agents and achieve an expanding and/or foaming effect, optionally in accordance with temperature.

DESCRIPTION OF THE PREFERRED EMBODIMENTS

Figure 1:
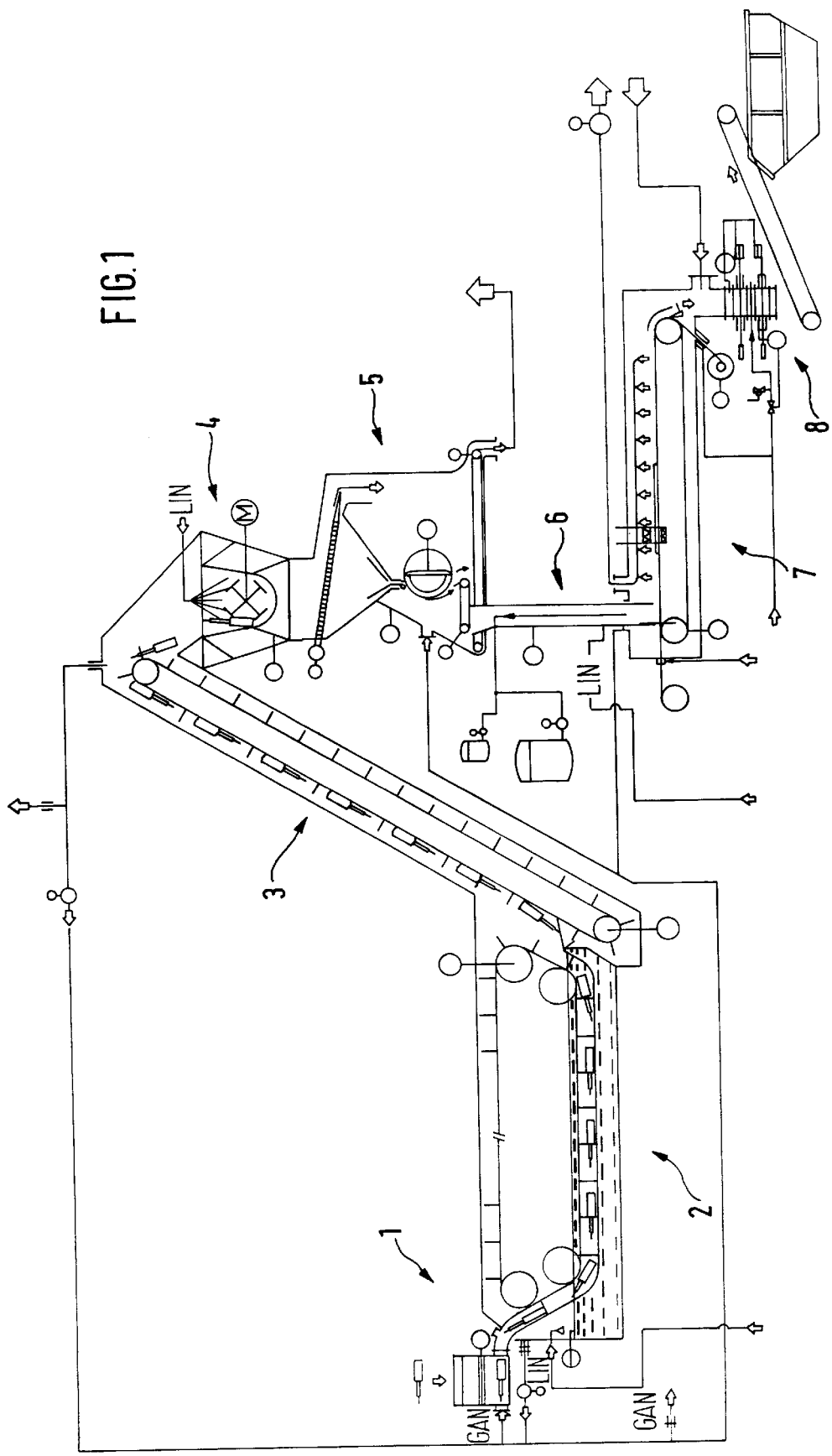
FIG. 1 schematically shows a plant for recycling packings.
Figure 2:
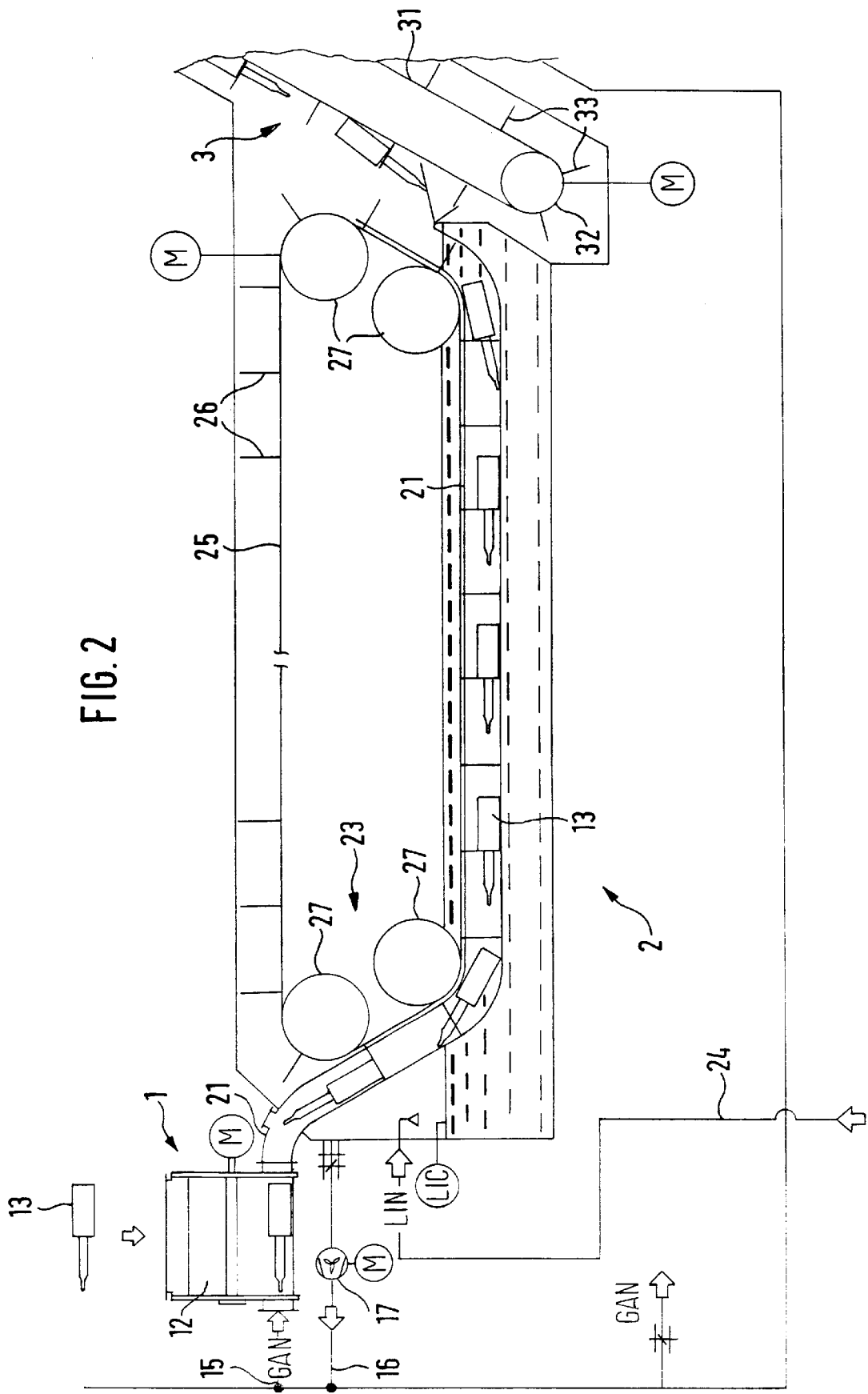
FIG. 2 shows the entry area of the plant according to FIG. 1.

The recycling plant for cartridges having reactive residues as shown in FIG. 1 has entry sluice 1 which is fed cartridges 13 to be treated. The entry sluice is preferably formed as a cellular wheel pneumatic sluice into chambers 12 of which cartridges 13 fall from above, as illustrated in FIG. 2, via a feed hopper (not shown). Rotation of cellular wheel 1 causes the cartridges to pass into the lower area of the sluice and be ejected laterally with the help of gaseous nitrogen GAN from pipe 15. To make this possible the cellular wheel rotates in a gastight container open at the top which can be subjected to pressurized gaseous nitrogen GAN from one side in its lower area so that cartridge 13 therein can be ejected on the opposite side into guide system 21. The nitrogen supply via pipe 15 is preferably ensured with gaseous nitrogen from cold bath 2. Obviously the rotational speed of cellular wheel 1 and the pressure surges from nitrogen pipe 15 for ejecting the cartridges from the cellular wheel are mutually coordinated. The cellular wheel has for this purpose a measuring sensor marked M.

From the cellular wheel the cartridges pass via guide 21 into cold bath 2 filled with liquid nitrogen. Guide 21 expediently consists of an elongate basket construction open on all sides which permits unhindered admission of liquid nitrogen and escape of gaseous nitrogen.

On their way through cold bath 2, which is supplied with fresh liquid nitrogen LIN in accordance with level via pipe 24 and has measuring sensor LIC for checking level, cartridges 13 are cooled to the bath temperature. The cage structure of guide 21 ensures free admission of cooling medium and quick discharge of produced gaseous nitrogen. Gaseous nitrogen is removed from the bath area via pipe 16 with the help of ventilator 17. The length of guide 21 and the transport speed are adjusted so that cartridges 13 are cooled to a sufficiently low temperature of at least −80° C. to −100° C. even when completely filled with remainder.

Cartridges 13 are transported in guide 21 with the help of transport device 23 expediently consisting of circulating transport belt 25 with protruding transport forks 26 which engage in guide 21 from above and push cartridges 13 guided therein ahead of themselves. Transport rolls 27 ensure precise guidance of transport forks 26. Forks 26 are disposed on transport belt 25 at intervals coordinated with the size of cartridges 13 to be transported. Measuring unit M serves to monitor the transport speed and its coordination with the feed rate of cartridges 13.

Figure 3:
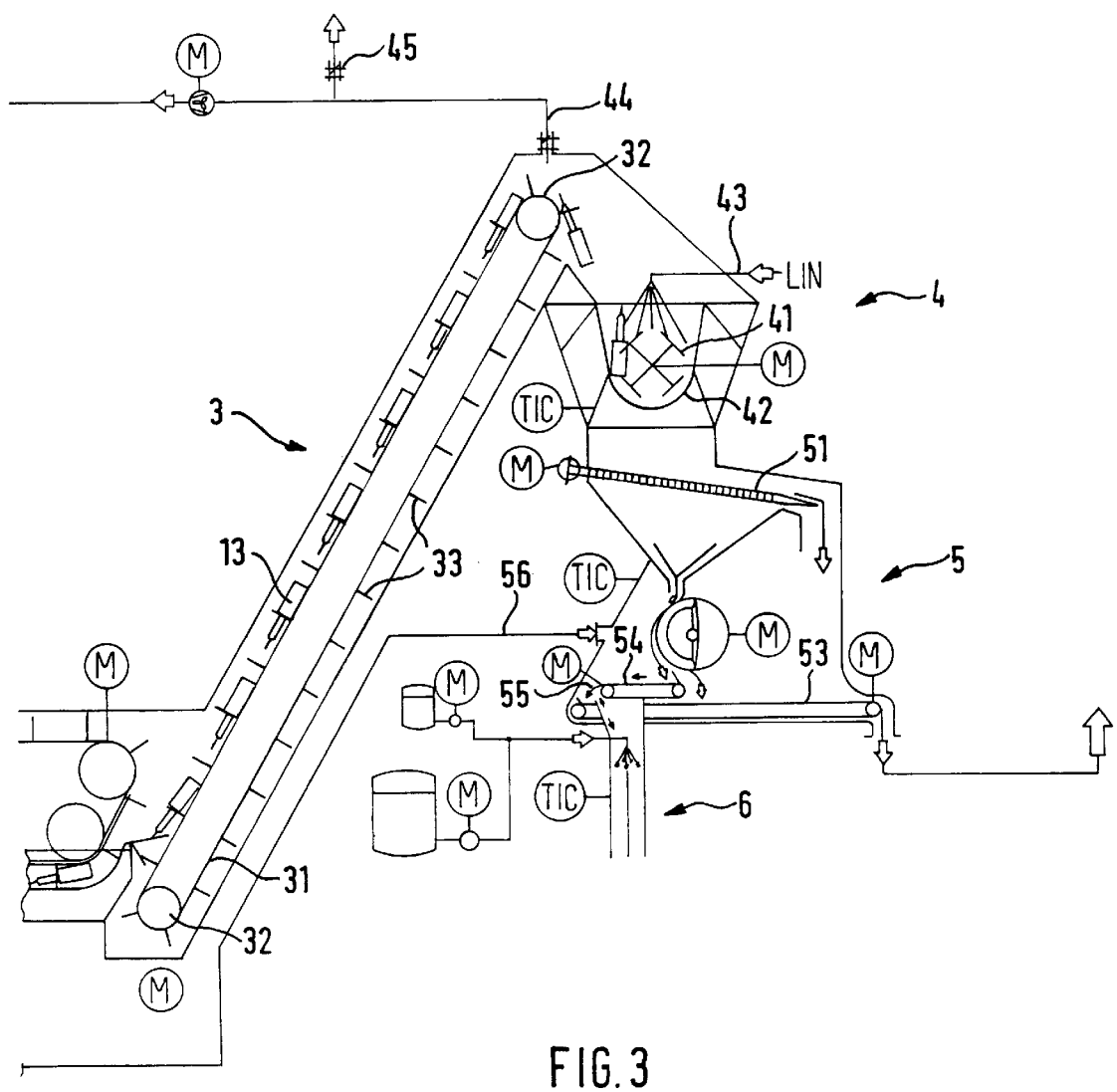
FIG. 3 shows the conveying, crushing and sorting part of the plant according to FIG. 1.

After running through cold bath 2 cartridges 13 pass out of guide 21 into conveying device 3 (FIG. 3) in the form of circulating conveyer belt 31 having transport segments coordinated with the size of cartridges 13. Conveying device 3 is preferably formed as a steep conveyor which receives cartridges 13 in the segments formed by transport forks 33 disposed at regular intervals and releases them overhead into crushing device 4. The conveyer belt is guided via rolls 32 provided with measuring unit M for monitoring and controlling the conveying speed.

Crushing device 4 consists of a shredder or preferably hammer mill 41. Hammer mill 41 preferably works against a sifter to guarantee a certain particle size of the crushed material. Sifter 42 simultaneously produces a fulling effect which promotes separation of the ingredients embrittled by the cold from the container material. Obviously one can add cooling medium, preferably liquid nitrogen LIN, via pipe 43 for maintaining the necessary low temperatures of −80° C. to −100° C. if temperature check TK indicates an inadmissible rise in temperature. The working speed is checked and controlled via measuring sensor M. Gaseous nitrogen is removed via pipe 44 and recycled or blown off via valve 45.

From crushing device 4 the crushed material passes into sorting device 5. This consists first of riddle sifter 51 on which coarse parts are separated from fine parts. Coarse parts are mainly the crushed materials of the container which are shaken off on inclined sifter 51 and discharged from the process via a sluice not shown.

Powdery ingredients and fine parts of the container pass through riddle sifter 51 onto first magnetic separator 52 which separates remaining iron and aluminum components from plastic particles and ingredients. On first magnetic separator 52 magnetic components are first separated and fed to first transport belt 53 which also receives the metal and plastic parts shaken off by sifter 51. Second transport belt 54 receives plastics, ingredients and nonmagnetic metal parts, which are divided into metallic and nonmetallic fractions via second magnetic separator 55 coupled with the transport belt. The metallic fractions pass onto first transport belt 53, the nonmetallic are guided directly into spray tower 6. Cold gaseous nitrogen can be supplied via pipe 56 if temperature check TIC indicates an inadmissible rise in temperature. Measuring sensors M check the working speed of all moving parts of separating system 5. If the cartridges consist entirely of nonmetallic materials the magnetic separators can naturally be dispensed with.

Obviously a temperature of no more than −80° C. to −100° C. is ensured both in the crushing plant and in the sorting device by suitable feeding pipes for cooling medium, preferably nitrogen in gaseous or liquid form.

Figure 4:
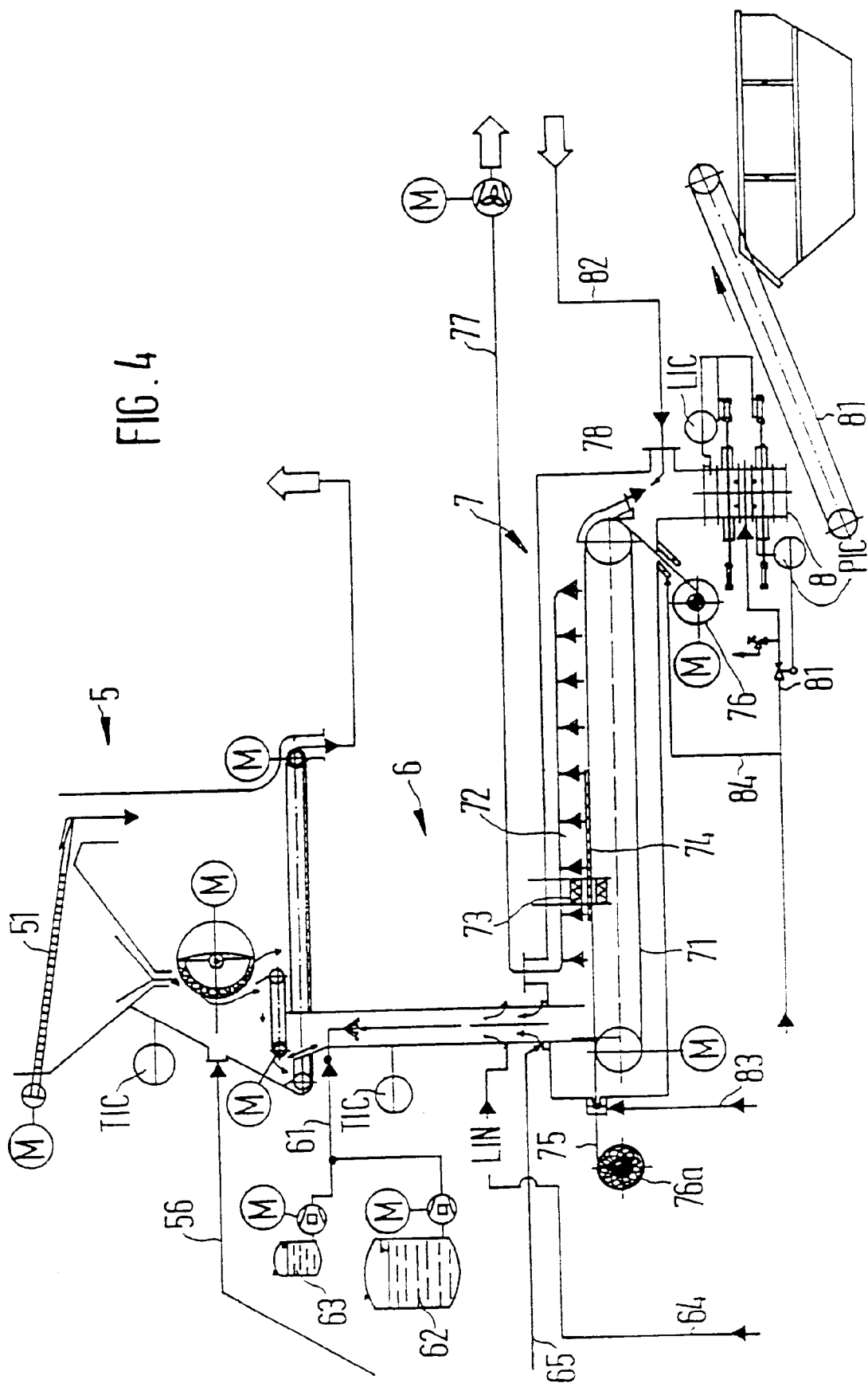
FIG. 4 shows the mixing and reaction zones of the plant according to FIG. 1.

The powdery ingredients and plastic parts passing into spray tower 6 (FIG. 4) and having a temperature of no more than −80° C. to −100° C. so that solvents contained therein are also present in a solid state, are mixed with reacting medium and optionally catalyst sprayed into the upper area of spray tower 6 via feed 61. The reacting medium, preferably ethylene glycol, is located in the liquid state in supply tank 62, the catalyst in supply tank 63. Both tanks have metering units coordinated therewith.

Reacting medium from tank 62 and catalyst from tank 63 are sprayed into spray tower 6 via pipe 61 in dosed relation to the reactive ingredients, whereby a precooling stretch can be provided in the course of feeding pipe 61 for cooling the materials to a beneficial temperature (above melting point). The spray material solidifies upon entering or within the spray tower itself at the temperatures of less than −80° C. to −100° C. prevailing there. For maintaining the temperature in the spray tower it is therefore expedient to introduce cooling medium additionally, for example liquid nitrogen LIN via pipe 64 or gaseous nitrogen via pipe 65, if temperature check TIC indicates a need therefor. It is expedient to spray the cooling medium into the lower areas of the spray tower to ensure additional swirling and mixture of reactive compound, catalyst and reactive can content by cold nitrogen rising in spray tower 6.

From spray tower 6 the mixture of reactive cartridge content, reactive compound and catalyst passes in powder form into reaction space 7. Within reaction space 7 there is reaction belt 71 for receiving the falling material from spray tower 6 and guiding it into actual reaction zone 72 where the reaction is induced by heat. For this purpose heat elements 73 are disposed above conveyer belt 71 for heating the reaction material on conveyer belt 71 with microwaves or infrared rays to a temperature sufficient for reaction, for example room temperature or thereabove.

To prevent reaction material 74, i.e. the mixture of reactive cartridge content, reactive compound and catalyst, from sticking to conveyer belt 71 it may be expedient to cover the conveyer belt with separating foil 75 which is wound off roll 76a and onto second roll 76b. The separating foil is optionally reusable.

On conveyer belt 71 the reaction material reacts into the particular product desired. At the same time solvents and adsorptively bound cooling medium nitrogen still contained in the mixture from the spray tower are released and sucked off via pipe 77 and directed to separation and solvent recovery (not shown). In the presence, or upon formation, of a foaming agent, such as pentane or $CO_2$, the escape from reaction material 74 causes partial foaming of the reaction material, which is not undesirable for certain purposes.

At the end of conveyer belt 71 there is scraper 78 for detaching the reacted reaction material from the conveyer belt or separating foil, it being passed out of the process via product sluice 8 and taken away via conveyer belt 81. Nitrogen pipes 81 and 82 regulate the protective gas supply in the sluice area, the protective gas used being expediently nitrogen, which need not be cooled. Further nitrogen pipes 83 and 84 in the area of the entrance and exit of separating foil 75 prevent oxygen from entering the system in this area. It is also unnecessary to use cool nitrogen here.

Obviously the inventive process is performed in a cold- and heat-insulated plant. In particular the entrance of oxygen must also be prevented in order to prevent liquid oxygen from condensing into cold bath 2. It is of advantage for the gas distribution to perform the entire process including spray tower 6 at temperatures at which solvent and foaming agent exist in a solid state. This permits them to be removed centrally via suction pipe 77 in reaction space 7 and directed to recovery. The reacted/cured polyurethane material emerging from the process in product sluice 8 can be directed to any desired further use in the form of granules. Possible uses are for example for insulating materials and in composite materials.

I claim:

1. A process for producing a substantially homogeneous solid mixture of reactive substances, the process comprising the steps of:

introducing one of the substances into a cold zone;

cooling the substance in the cold zone to a solid and unreactive state;

converting the solid and unreactive substance into a finely distributed state;

introducing the finely distributed substance into a spray tower;

spraying remaining reactive substances which are reactive with the substances introduced into the cold zone into the spray tower which cools and solidifies the sprayed substances to an unreactive state during spraying to form a substantially homogeneous solid mixture of reactive substances; and spraying cold nitrogen into the spray tower to maintain a temperature in the spray tower below a softening temperature of the mixture.

2. The process of claim 1 wherein the step of spraying cold nitrogen maintains the temperature in the spray tower at under −80° C.

3. The process of claim 1 wherein the step of spraying cold nitrogen maintains the temperature in the spray tower at a temperature of liquid nitrogen in the absence of oxygen.

4. The process of claim 1 wherein at least one of the substances is present as a liquid prior to the steps of cooling and spraying.

5. The process of claim 1 wherein at least one of the substances is dissolved in a solvent prior to the steps of cooling and spraying.

6. The process of claim 1 wherein the step of converting comprises mechanically pulverizing the solid substance at a temperature of under −80° C.

7. The process of claim 1 wherein the step of spraying cold nitrogen comprises spraying gaseous cold nitrogen into a lower area of the spray tower for temperature control.

8. The process of claim 1 wherein the step of spraying cold nitrogen comprises spraying liquid cold nitrogen into a lower area of the spray tower for temperature control.

9. The process of claim 1 further comprising the steps of transferring the solid mixture from the spray tower to a reaction zone and bringing the solid mixture to a temperature sufficient for the substances to react in the reaction zone.

10. The process of claim 9 further comprising the step of adding additives into the reaction zone.

11. The process of claim 9 further comprising the step of heating the reaction zone with microwaves.

12. The process of claim 1 further comprising the step of obtaining the reactive substances from reactive residues contained in packings.

13. The process of claim 12 wherein the step of obtaining the reactive substances comprises obtaining the reactive residues of prepolymers containing isocyanate groups from polyurethane foam production.

14. The process of claim 13 further comprising the step of mixing the prepolymers containing isocyanate groups with a hydroxy compound.

15. The process of claim 14 wherein the hydroxy compound is selected from the group consisting of water, ethylene glycol and a polyether alcohol.

16. The process of claim 1 further comprising the step of adding additives into the spray tower.

17. A process for producing a substantially homogeneous solid mixture of reactive substances, the process comprising the steps of:

cooling one of the substances into a cold zone to a solid and unreactive state;

introducing the solid and unreactive substance in a finely distributed state into a spray tower; and spraying remaining reactive substances which are reactive with the substances introduced into the cold zone into the spray tower which cools and solidifies the sprayed substances to an unreactive state during spraying to form a substantially homogeneous solid mixture of reactive substances, the spray tower being maintained at a temperature below a softening temperature of the mixture by cold nitrogen.

* * * * *